(12) United States Patent
Baran

(10) Patent No.: US 11,204,493 B2
(45) Date of Patent: Dec. 21, 2021

(54) DISPLAY DEVICE HAVING SCANNING MIRROR SYSTEM

(71) Applicant: Microsoft Technology Licensing, LLC, Redmond, WA (US)

(72) Inventor: Utku Baran, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 221 days.

(21) Appl. No.: 16/295,842

(22) Filed: Mar. 7, 2019

(65) Prior Publication Data

US 2020/0285045 A1 Sep. 10, 2020

(51) Int. Cl.
*G02B 26/08* (2006.01)
*G02B 5/10* (2006.01)
*G02B 27/01* (2006.01)

(52) U.S. Cl.
CPC .......... *G02B 26/0825* (2013.01); *G02B 5/10* (2013.01); *G02B 27/0172* (2013.01)

(58) Field of Classification Search
CPC .. G02B 26/0825; G02B 5/10; G02B 27/0172; G02B 26/0858
USPC ........................................................ 359/846
See application file for complete search history.

(56) References Cited

U.S. PATENT DOCUMENTS

| | | | |
|---|---|---|---|
| 5,934,140 A * | 8/1999 | Jackson | G01N 33/346 250/559.27 |
| 7,485,485 B2 | 2/2009 | Linden et al. | |
| 7,990,595 B1 * | 8/2011 | Chou | G02B 26/085 359/198.1 |
| 8,488,224 B2 * | 7/2013 | Brown | G02B 26/0841 359/199.2 |
| 2005/0173770 A1 | 8/2005 | Linden et al. | |
| 2012/0162739 A1 | 6/2012 | Yamada | |

(Continued)

FOREIGN PATENT DOCUMENTS

EP 3214480 A1 9/2017

OTHER PUBLICATIONS

Baran, et al., "High Frequency Torsional Mems Scanner For Displays", In Proceedings of the IEEE 25th International Conference on Micro Electro Mechanical Systems (MEMS), Jan. 29, 2012, pp. 636-639.

(Continued)

*Primary Examiner* — Jade R Chwasz
(74) *Attorney, Agent, or Firm* — Alleman Hall Creasman & Tuttle LLP

(57) ABSTRACT

Scanning mirror systems for display devices are disclosed. A display device comprises a light source and a scanning mirror system coupled to a support structure, the scanning mirror system comprising a mirror, a flexure supporting the mirror, and a first anchor and a second anchor each coupled to the support structure. The scanning mirror system further includes a first arm extending between the first anchor and a first portion of the flexure, a second arm extending between the first anchor and a second portion of the flexure, and also includes a third arm, a fourth arm, and an actuator system. Each of the first arm and the second arm define a respective gap that extends inwardly from an outer perimeter of the scanning mirror system. The actuator system is configured to actuate the arms to vary a scan angle of the mirror.

19 Claims, 5 Drawing Sheets

(56) References Cited

U.S. PATENT DOCUMENTS

2017/0257611 A1* 9/2017 Tanaka ................ G02B 26/105
2018/0039074 A1* 2/2018 Oyama ............... H01L 41/0946

OTHER PUBLICATIONS

Baran, et al., "Resonant PZT MEMS Scanner for High-Resolution Displays", In Journal of microelectromechanical systems, vol. 21, Issue 6, Dec. 1, 2012, pp. 1303-1310.

Baran, et al., "Video-rate volumetric optical coherence tomography-based microangiography", In Journal of Optical Engineering, vol. 55, Issue 4, Apr. 26, 2016, 3 pages.

Holmstrom, et al., "MEMS laser scanners: a review", In Journal of Microelectromechanical Systems, Apr. 1, 2014, pp. 259-275.

Lee, et al., "LIDAR system using indirect time of flight method and MEMS scanner for distance measurement", In Proceedings of the International Conference on Optical MEMS and Nanophotonics (OMN), Jul. 31, 2016, pp. 1-2.

"International Search Report and Written Opinion Issued in PCT Application No. PCT/US2020/020239", dated Jun. 8, 2020, 13 Pages.

* cited by examiner

DISPLAY DEVICE HAVING SCANNING MIRROR SYSTEM

BACKGROUND

A display device may utilize a scanning mirror system to scan light from a light source to produce a viewable image.

SUMMARY

Examples are disclosed that relate to scanning mirror systems for display devices. One example provides a display device comprising a light source and a scanning mirror system coupled to a support structure, the scanning mirror system comprising a mirror, a flexure supporting the mirror, and a first anchor and a second anchor each coupled to the support structure. The scanning mirror system further includes a first arm extending between the first anchor and a first portion of the flexure, a second arm extending between the first anchor and a second portion of the flexure, and also includes a third arm, a fourth arm, and an actuator system. Each of the first arm and the second arm define a respective gap that extends inwardly from an outer perimeter of the scanning mirror system. The actuator system is configured to actuate the arms to vary a scan angle of the mirror.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In a scanning display system, light from a light source may be scanned in one or more directions by varying an angle of a scanning mirror while controlling light emitted from one or more light sources to produce a viewable image. The resolution of a scanning display system may depend upon an angle through which the mirror is scanned and the size of the mirror. However, expanding scan angle and/or mirror size to increase resolution may pose various drawbacks. For example, increasing the size of a mirror may lead to greater mirror deformation during scanning (thereby decreasing image quality), may reduce a maximum scanning frequency, and/or may increase a cost, power consumption, and/or overall size of a scanning mirror system. For applications such as a head-mounted display (HMD) device, where a compact form factor and viewer comfort may be prioritized, the size of a scanning mirror system may be of particular concern.

Likewise, increasing a scan angle of a mirror also may pose challenges. As one approach, an external actuator may be used to drive a scanning mirror through large scan angles. However, the use of an external actuator may increase cost, power consumption, size, and/or mirror deformation. Further, high scan angles may increase the strain in a flexure that connects a scanning mirror to an actuator. While increased flexure strain may be at least partially mitigated by increasing flexure length and reducing flexure thickness, longer flexures increase scanning mirror system size. Moreover, strain sensors in a scanning mirror system may experience degradation due to the very strain those sensors are configured to sense, in turn limiting the operational lifetime of the sensors and the overall scanning mirror system.

Accordingly, examples are disclosed that relate to a scanning mirror system in which the actuation of a mirror is mechanically amplified by a structure having a compact profile, thereby helping to achieve a relatively larger scan angle while maintaining a relatively smaller size compared to approaches that involve increasing a flexure length. Examples are also disclosed that relate to a scanning mirror system comprising a strain sensor arranged at an anchor of the scanning mirror system. Such an anchor placement may experience less strain during actuation of the mirror relative to the placement of the sensor in other regions. As such, the operational lifetime of the sensor, and the overall scanning mirror system, may be increased relative to other sensor placements that experience more strain.

Figure 1:
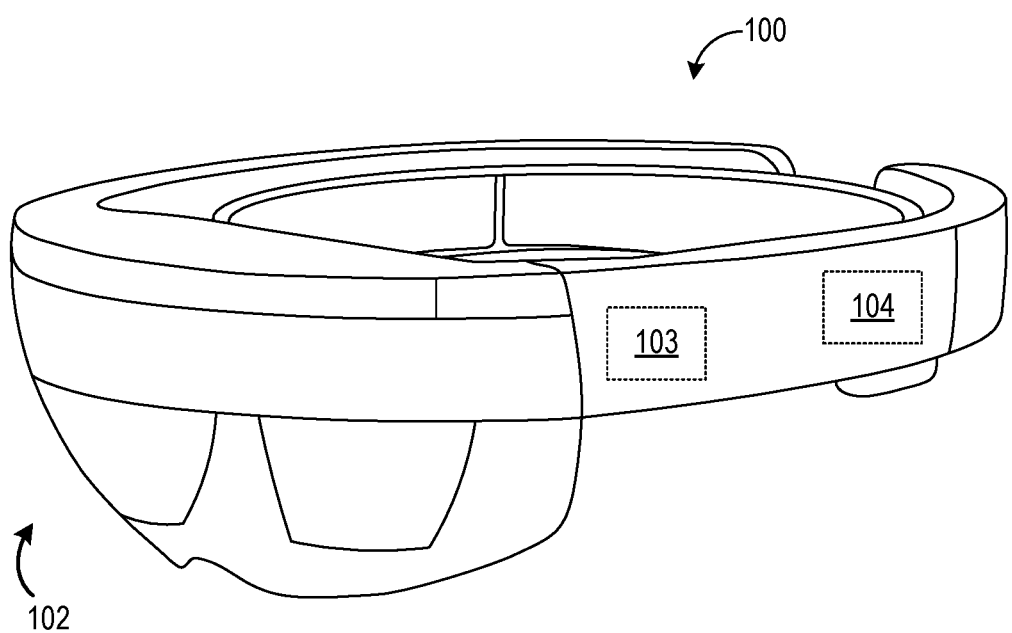
FIG. 1 shows an example head-mounted display device.

The example scanning mirror systems disclosed herein may be implemented in any suitable display device. Examples include but are not limited to HMD devices and other near-eye display devices, as well as televisions, monitors, and mobile device displays. FIG. 1 shows an example HMD device 100 that may implement a scanning mirror system in accordance with the examples disclosed herein. HMD device 100 includes a display system configured to display near-eye imagery to a wearer. In some implementations, the display system comprises a display 102 that is substantially opaque, presenting virtual imagery as part of a virtual-reality experience in which a wearer of HMD device 100 is completely immersed in the virtual-reality experience. In other implementations, the display system comprises a display 102 that is at least partially transparent, allowing a user to view presented virtual imagery along with a real-world background viewable through the display to form an augmented reality experience, such as a mixed-reality experience. In some examples, the opacity of display 102 is adjustable (e.g. via a dimming filter), enabling the display to function both as a substantially opaque display for virtual-reality experiences and as a see-through display for augmented reality experiences.

The display system further includes a scanning mirror system 103 configured to scan light from a light source to thereby form virtual imagery viewable by a wearer of HMD device 100. HMD device 100 may comprise any suitable optical elements to display, via display 102, the virtual imagery produced by scanning mirror system 103, such as one or more light sources, waveguide, holographic optical elements, lenses, diffraction gratings, etc.

HMD device 100 further comprises a computing device 104 configured to perform various computing functions, including but not limited to generating virtual imagery for display on display 102. Computing device 104 may include any suitable computing hardware, such as a logic subsystem (e.g. a processor) and a storage subsystem. The logic subsystem may be configured to execute instructions stored on the storage subsystem to implement any suitable computing functions. Example computing system hardware is described in more detail below with reference to FIG. 5. In other examples, at least some computing functions may be performed off-board.

HMD device 100 may include various sensors and related systems to provide information to computing device 104. Such sensors may include, but are not limited to, one or more inward facing image sensors (e.g. for eye tracking), one or more outward facing image sensors, an inertial measurement unit (IMU), and one or more microphones (e.g. for receiving voice commands).

Figure 2:
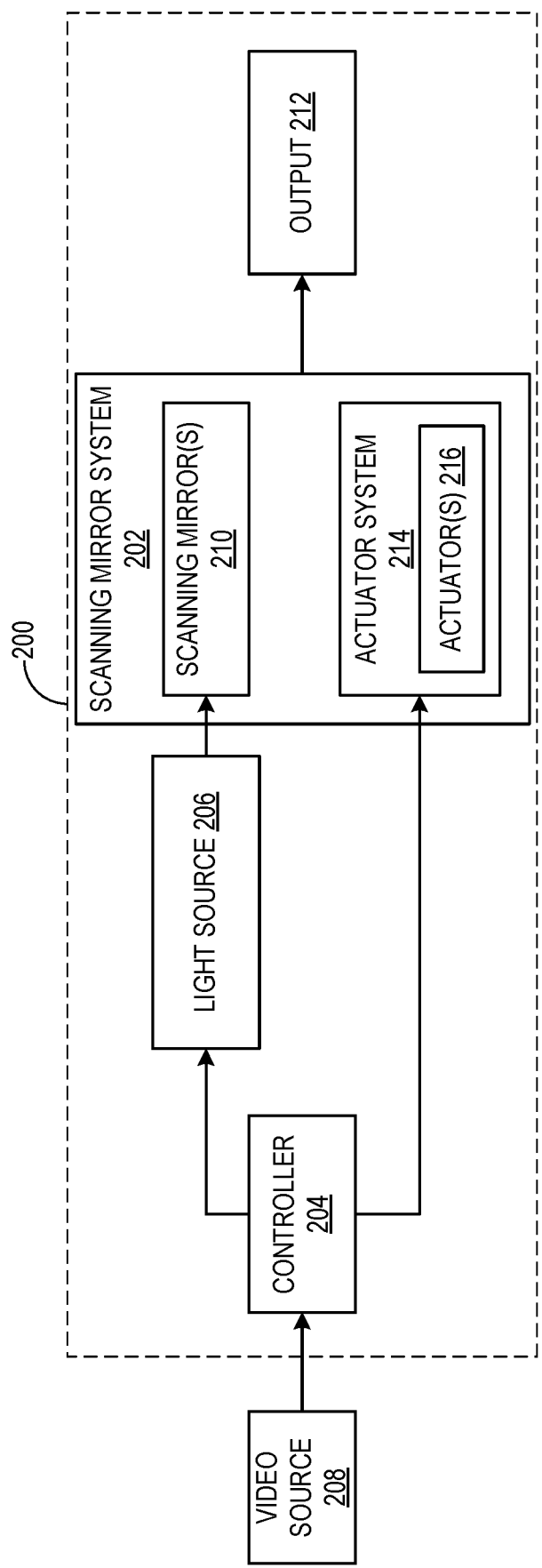
FIG. 2 shows a block diagram of an example display device that utilizes a scanning mirror system to form an image.

FIG. 2 schematically shows an example display device 200 including a scanning mirror system 202. The display system of HMD device 100 may implement aspects of display device 200, for example. Display device 200 includes a controller 204 operatively coupled to scanning mirror system 202 and to a light source 206. Controller 204 is configured to control light source 206 to emit light based on video image data received from a video source 208 (e.g. computing device 104). Light source 206 may include any suitable light-emitting elements, such as one or more lasers. Further, light source 206 may output light in any suitable wavelength ranges—e.g. red, green, and blue wavelength ranges that enable the production of color images. In other examples, light source 206 may output substantially monochromatic light.

Scanning mirror system 202 comprises one or more scanning mirrors 210 controllable to vary an angle at which light from light source 206 is reflected to thereby scan an image. In some examples, scanning mirror system 202 may include a single mirror configured to scan light in horizontal and vertical directions, while in other examples the scanning mirror system may include separate mirrors for scanning in the horizontal and vertical directions.

Light reflected by scanning mirror system 202 is directed toward an output 212 for display of a scanned image. Output 212 may take any suitable form, such as projection optics, waveguide optics, etc.

Scanning mirror system 202 comprises an actuator system 214 including one or more actuators 216 controllable to actuate scanning mirror(s) 210. As described below with reference to FIG. 3, actuator(s) 216 may actuate a scanning mirror 210 by driving rotational motion of a flexure supporting the scanning mirror. Actuator(s) 216 may assume any suitable form, including but not limited to piezoelectric, electrostatic, and electromagnetic forms.

Figure 3:
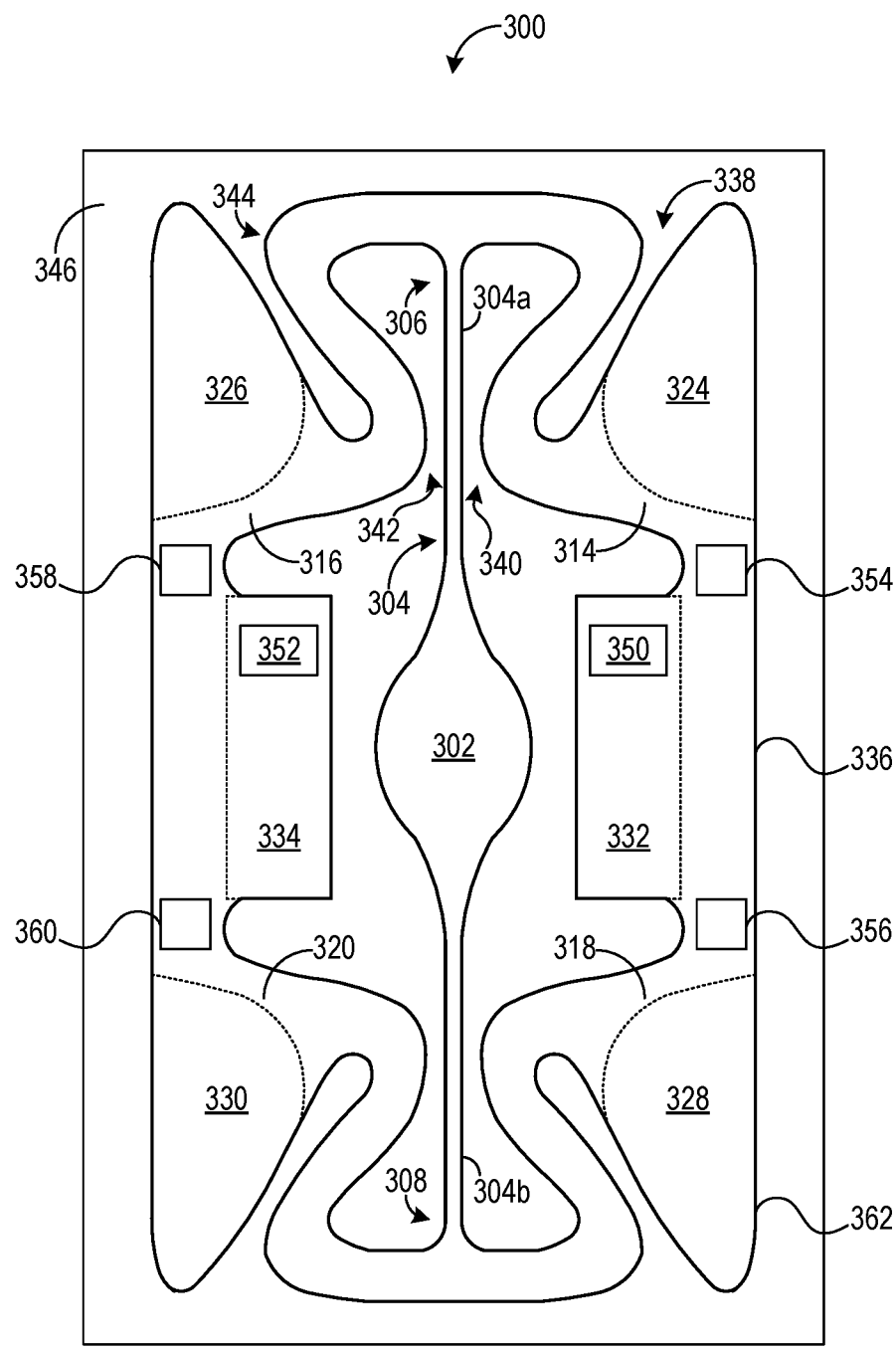
FIG. 3 shows an example scanning mirror system.

FIG. 3 shows an example scanning mirror system 300 comprising a scanning mirror 302 controllable to vary an angle at which light from a light source (e.g. light source 206) is reflected to thereby form a displayed image. Aspects of scanning mirror system 300 may be implemented in scanning mirror system 103 of HMD device 100 and/or scanning mirror system 202, for example. As described in further detail below, scanning mirror system 300 includes an actuator system configured to vary the scan angle of mirror 302 by generating torsional forces imparted to a flexure supporting the mirror via arms that amplify forces imparted to the flexure, thereby increasing the angular scanning range of the mirror while supporting the implementation of scanning mirror system 300 in a compact form factor. Scanning mirror system 300 further may include one or more strain sensors configured to sense strain in the scanning mirror system, and thereby monitor a current angle of the mirror to provide feedback for controlling the mirror. In some examples, a strain sensor may be located in a region that experiences relatively low levels of strain, such as an anchor region of the mirror system. As such, reduced degradation and longer operational lifetimes of the sensor may be achieved compared to other sensor placements. Further, in some examples, output from a strain sensor positioned in a lower-strain region may be used to calibrate another strain sensor located in a region that experiences relatively higher magnitudes of strain.

Scanning mirror system 300 includes a flexure 304 that supports mirror 302. Flexure 304 includes a first portion 304a extending in a first direction from mirror 302, and a second portion 304b extending in a second direction from the mirror. Toward a distal end 306 in the first direction, first portion 304a couples with a first arm 314 and a second arm 316. Similarly, toward a distal end 308 in the second direction, second portion 304b couples with a third arm 318 and a fourth arm 320.

Scanning mirror system 300 further includes an actuator system configured to vary the scan angle of mirror 302. In the depicted example, actuator system includes four actuators arranged along respective arms of scanning mirror system 300. The depicted actuators take the form of thin films of a piezoelectric material, but in other examples any other suitable actuation mechanism may be used, including electrostatic and electromagnetic actuators. Each actuator is positioned adjacent to a respective arm, and is configured to impart motion to the respective arm. In turn, the respective arm is configured to impart received motion to a corresponding portion of flexure 304 to thereby move mirror 302.

More specifically, the depicted actuator system includes a first actuator 324 configured to actuate first arm 314, a second actuator 326 configured to actuate second arm 316, a third actuator 328 configured to actuate third arm 318, and a fourth actuator 330 configured to actuate fourth arm 320. First and second arms 314 and 316 impart motion respectively received from actuators 324 and 326 to first portion 304a of flexure 304, and third and fourth arms 318 and 320 impart motion respectively received from actuators 328 and 330 to second portion 304b of the flexure. Motion communicated to flexure 304 from the actuator system via the arms may be communicated to mirror 302 via the flexure to thereby vary the scan angle of the mirror. An example illustrating actuation of mirror 302 is described below with reference to FIGS. 4A-4B.

Each of arms 314, 316, 318, and 320 may be configured to mechanically amplify motion created by the actuator system. As such, the output force of a given arm imparted to flexure 304 may be greater than a corresponding input force received from an actuator, thereby achieving a mechanical advantage that results in amplified motion of mirror 302 and thus a greater range of scan angles compared to arrangements lacking such arms. For each arm, a mechanical advantage may be achieved by configuring that arm to function in a lever-like manner, undergoing motion about a corresponding pivot. In the depicted example, scanning mirror system 300 comprises two anchors, from each of which two corresponding arms extend. Each anchor is configured as a pivot for the corresponding pair of arms. In particular, first arm 314 extends between a first anchor 332 and first portion 304a of flexure 304, second arm 316 extends between a second anchor 334 and the first portion of the flexure, third arm 318 extends between the first anchor and second portion 304b of the flexure, and fourth arm 320 extends between the second anchor and the second portion of the flexure. Anchors 332 and 334, located on opposing sides of mirror 302, may function as pivots by being fixed to an underlying structure during actuation of mirror 302.

In the depicted example, each arm comprises a geometry that defines a respective first gap between that arm and a corresponding actuator, where the gap extends inwardly from an outer perimeter 336 of scanning mirror system 300. Further, each arm defines a respective second gap between that arm and a corresponding portion of flexure 304. More specifically, with reference to first arm 314, the first arm 314 defines a first gap 338 extending inwardly from outer perimeter 336. The first arm 314 also defines a second gap 340 between first portion 304a of flexure 304 and the first arm 314. For each arm, the respective first and second gaps defined by that arm separate portions of the arm from corresponding portions of flexure 304 and corresponding actuators. This separation enables each arm to function in a lever-like manner and mechanically amplify motion of mirror 302.

The geometry of the arms may enable implementation of the arms in a compact space. As shown in FIG. 3, each arm is configured with a meandering geometry extending in a serpentine shape inwardly from a distal end of flexure 304 toward a respective anchor, but may have other suitable shapes in other examples. Such a meandering geometry may help to reduce an overall strain experienced by the arms during actuation due to the increased length of the arms. The meandering geometry of the arms may be defined in part by one or more curves generally demarcating regions of differing curvature. For example with reference to second arm 316, the second arm includes a curve 342 and a second curve 344 that separate regions of the arm extending in different directions. Other examples may utilize other geometries for the arms.

As described above, anchors 332 and 334 may function as pivots for the arms by being fixed to an underlying support structure, such as a circuit board 346. The coupling of anchors 332 and 334 to circuit board 346 provides sufficient separation between scanning mirror system 300 and the circuit board for the other portions of the scanning mirror system (e.g. the actuators, arms, flexure 304) to move during actuation of mirror 302. Any suitable mechanism may be employed to couple anchors 332 and 334 to circuit board 346, including but not limited to wire bonding, which also allows the formation of electrical connections to actuators and strain sensors on the scanning mirror system. While anchors 332 and 334 are depicted as generally rectangular regions in FIG. 3, the anchors may exhibit any other suitable geometry.

Circuit board 346 may include drive circuitry configured to drive the actuator system. As mentioned above, scanning mirror system 300 may be electrically coupled to circuit board 346 via one or more wire bonds that couple the anchor regions of the scanning mirror system to the circuit board. Circuit board 346 may implement at least a portion of controller 204, in some examples.

Circuit board 346 may include circuitry for receiving output from a sensor system configured to sense strain in scanning mirror system 300. Output from the sensor system may be used as a feedback signal in controlling the actuator system, for example. In the example depicted in FIG. 3, the sensor system includes a first anchor sensor 350 located at first anchor 332, and a second anchor sensor 352 located at second anchor 334. While respectively shown in FIG. 3 toward one side of first and second anchors 332 and 334, first and second anchor sensors 350 and 352 may be located at any suitable region of the anchors. First and second anchor sensors 350 and 352 are configured to sense strain of flexure 304 by sensing strain experienced in first and second anchors 332 and 334, respectively. As described above, first and second anchors 332 and 334 may experience reduced strain relative to other regions of scanning mirror system 300 during actuation of mirror 302 by virtue of their coupling to circuit board 346. As a result, first and second anchors 332 and 334 may also experience less strain relative to other regions of scanning mirror system 300. Thus, by arranging first and second anchor sensors 350 and 352 respectively at first and second anchors 332 and 334, degradation of the anchor sensors may be reduced, in turn increasing their operational lifetime and that of scanning mirror system 300.

In some examples, the sensor system further may include one or more strain sensors that are located at non-anchor locations spaced from first and second anchors 332 and 334. In the example depicted in FIG. 3, the sensor system includes a first non-anchor sensor 354 and a second non-anchor sensor 356 at non-anchor locations spaced away from first anchor 332, and a third non-anchor sensor 358 and a fourth non-anchor sensor 360 at non-anchor locations spaced away from second anchor 334. Being spaced away from first and second anchors 332 and 334, the non-anchor sensor may experience greater strain relative to first and second anchor sensors 350 and 352 during actuation of mirror 302. While this positioning may provide the non-anchor sensor with greater sensitivity to small mirror movements, the non-anchor sensor also may experience some degradation over time that manifests as drift or otherwise reduced accuracy. To compensate such drift, output from first and/or second anchor sensors 350 and 352 may be used to recalibrate one or more of the non-anchor sensors (e.g. via a calibration program stored as executable instructions by a controller that operates scanning mirror system 300).

Scanning mirror system 300 may be formed in any suitable manner. In some examples, the flexure, mirror, anchors and arms are formed from a single substrate 362 by a suitable patterning method (e.g. laser cutting, physical or chemical etching, etc.). The actuator system and/or sensor system may comprise one or more layers disposed on substrate 362. As one example in which the actuator system and/or sensor system respectively include piezoelectric actuator(s) and piezoelectric sensor(s), the actuator(s) and/or sensor(s) may comprise a first electrode layer, a layer including a piezoelectric material, and a second electrode layer. In this arrangement, a voltage may be applied across the two electrode layers to cause a change in the lattice of the piezoelectric material, resulting in mechanical forces that actuate mirror 302. The mirror actuation induces strain in the piezoelectric material of one or more sensors, thereby inducing a voltage across the two electrode layers of each sensor and allowing the sensing of strain in flexure 304. In some examples, all of the sensors and actuators may be formed via common deposition steps using suitable patterning processes. Electrical connections to and from the sensors and actuators may be formed from a same material as the electrode layers, and may be deposited in a same process as one or more electrode layers of the sensors and/or actuators.

Figure 4A:
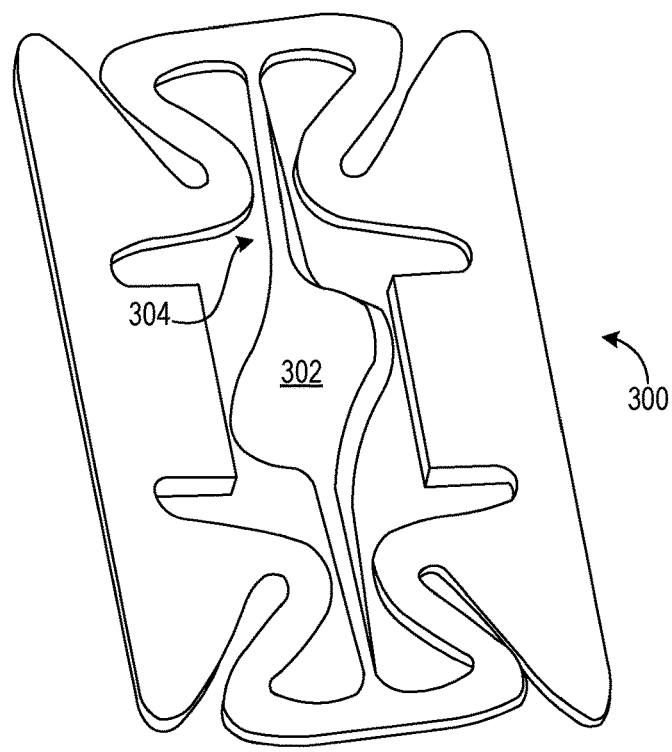
FIGS. 4A-4B illustrate actuation of the scanning mirror system of FIG. 3.
Figure 4B:
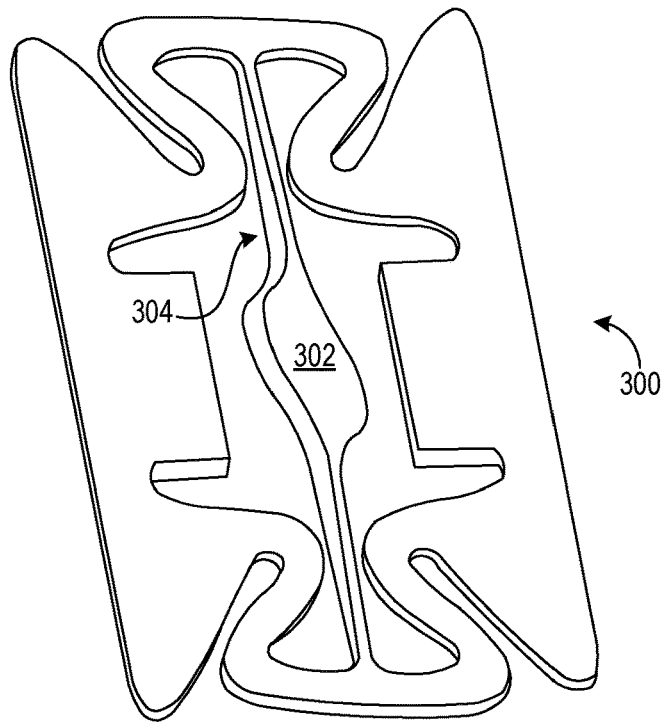

FIGS. 4A-4B illustrate actuation of scanning mirror system 300. In this example, mirror 302 scans light in a scanning direction through rotation of flexure 304. To rotate flexure 304, suitable voltages are applied across the actuators (wherein a different voltage may be applied across each actuator depending upon a desired mirror position), thereby causing the piezoelectric actuator materials to change shape and strain the mirror substrate. The resulting strain causes motion of the substrate, which is amplified by the arms to exert a rotational force on the flexure. FIG. 4A depicts mirror 302 oriented at a first scan angle, while FIG. 4B depicts the mirror oriented at a second angle. The first and second angles may be reflections of each other about the axis of rotation of mirror 302, for example. As may be seen from FIGS. 4A and 4B, the mechanical amplification of motion of mirror 302 via the arms of scanning mirror system 300 is such that the angle of the mirror is greater than those of the arms.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
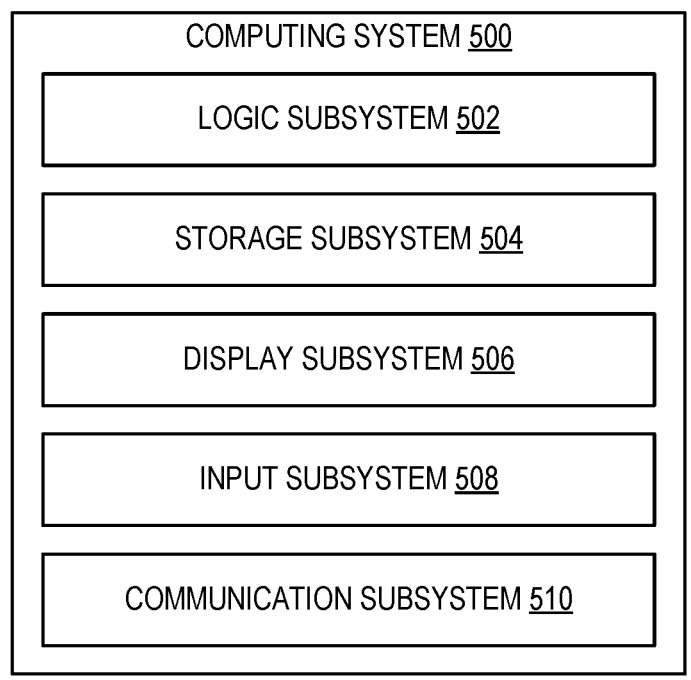
FIG. 5 shows a block diagram of an example computing system.

FIG. 5 schematically shows a non-limiting embodiment of a computing system 500 that can enact one or more of the methods and processes described above. Computing system 500 is shown in simplified form. Computing system 500 may take the form of one or more personal computers, server computers, tablet computers, home-entertainment computers, network computing devices, gaming devices, mobile computing devices, mobile communication devices (e.g. smart phone), and/or other computing devices.

Computing system 500 includes a logic subsystem 502 and a storage subsystem 504. Computing system 500 may optionally include a display subsystem 506, input subsystem 508, communication subsystem 510, and/or other components not shown in FIG. 5.

Logic subsystem 502 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem may include one or more processors configured to execute software instructions. Additionally or alternatively, the logic subsystem may include one or more hardware or firmware logic machines configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

Storage subsystem 504 includes one or more physical devices configured to hold instructions executable by the logic subsystem to implement the methods and processes described herein. When such methods and processes are implemented, the state of storage subsystem 504 may be transformed—e.g. to hold different data.

Storage subsystem 504 may include removable and/or built-in devices. Storage subsystem 504 may include optical memory (e.g. CD, DVD, HD-DVD, Blu-Ray Disc, etc.), semiconductor memory (e.g. RAM, EPROM, EEPROM, etc.), and/or magnetic memory (e.g. hard-disk drive, floppy-disk drive, tape drive, MRAM, etc.), among others. Storage subsystem 504 may include volatile, nonvolatile, dynamic, static, read/write, read-only, random-access, sequential-access, location-addressable, file-addressable, and/or content-addressable devices.

It will be appreciated that storage subsystem 504 includes one or more physical devices. However, aspects of the instructions described herein alternatively may be propagated by a communication medium (e.g. an electromagnetic signal, an optical signal, etc.) that is not held by a physical device for a finite duration.

Aspects of logic subsystem 502 and storage subsystem 504 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 500 implemented to perform a particular function. In some cases, a program may be instantiated via logic subsystem 502 executing instructions held by storage subsystem 504. It will be understood that different programs may be instantiated from the same application, code block, object, library, routine, API, function, etc. Likewise, the same program may be instantiated by different applications, code blocks, objects, routines, APIs, functions, etc. The term "program" may encompass individual or groups of executable files, data files, libraries, drivers, scripts, database records, etc.

When included, display subsystem 506 may be used to present a visual representation of data held by storage subsystem 504. This visual representation may take the form of a graphical user interface (GUI). As the herein described methods and processes change the data held by the storage subsystem, and thus transform the state of the storage subsystem, the state of display subsystem 506 may likewise be transformed to visually represent changes in the underlying data. Display subsystem 506 may include one or more display devices utilizing virtually any type of technology. Such display devices may be combined with logic subsystem 502 and/or storage subsystem 504 in a shared enclosure, or such display devices may be peripheral display devices.

When included, input subsystem 508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 510 may be configured to communicatively couple computing system 500 with one or more other computing devices. Communication subsystem 510 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

Another example provides a display device comprising a light source, and a scanning mirror system coupled to a support structure and configured to scan light from the light source to form a displayed image, the scanning mirror system comprising a mirror, a flexure supporting the mirror, the flexure comprising a first portion extending in a first direction from the mirror and a second portion extending in a second direction from the mirror, a first anchor and a second anchor each coupled to the support structure, the first anchor and the second anchor located on opposing sides of the mirror, a first arm extending between the first anchor and the first portion of the flexure, a second arm extending between the first anchor and the second portion of the flexure, each of the first arm and the second arm defining a respective gap that extends inwardly from an outer perimeter of the scanning mirror system, a third arm extending between the second anchor and the first portion of the flexure, a fourth arm extending between the second anchor and the second portion of the flexure, and an actuator system configured to actuate the first arm, the second arm, the third arm, and the fourth arm to thereby vary a scan angle of the mirror. In such an example, the actuator system may comprise one or more piezoelectric actuators. In such an example, the actuator system alternatively or additionally may comprise one or more of an electrostatic actuator and an electromagnetic actuator. In such an example, the support structure may comprise a circuit board, and the scanning mirror system may be electrically coupled to the circuit board via one or more wire bonds. In such an example, the display device alternatively or additionally may comprise a first sensor configured to sense strain of the flexure, the first sensor located at the first anchor. In such an example, the display device alternatively or additionally may comprise a second sensor configured to sense strain of the flexure, the second sensor located at a non-anchor location spaced from the first anchor, the non-anchor location undergoing greater strain during actuation by the actuator system relative to the first anchor. In such an example, the display device alternatively or additionally may comprise a logic subsystem and a storage subsystem storing instructions executable by the logic subsystem to calibrate the second sensor via output from the first sensor. In such an example, the first arm, the second arm, the third arm, and the fourth arm alternatively or additionally may be configured to mechanically amplify motion created by the actuator system. In such an example, each of the third arm and the fourth arm alternatively or additionally may define a respective gap that extends inwardly from the outer perimeter of the scanning mirror system.

Another example provides a scanning mirror system comprising a mirror, a flexure supporting the mirror, the flexure comprising a first portion extending in a first direction from the mirror and a second portion extending in a second direction from the mirror, a first anchor and a second anchor located on opposing sides of the mirror, a first arm extending between the first anchor and the first portion of the flexure, a second arm extending between the first anchor and the second portion of the flexure, each of the first arm and the second arm defining a respective gap that extends inwardly from an outer perimeter of the scanning mirror system, a third arm extending between the second anchor and the first portion of the flexure, a fourth arm extending between the second anchor and the second portion of the flexure, and an actuator system configured to actuate the first arm, the second arm, the third arm, and the fourth arm to thereby vary a scan angle of the mirror. In such an example, the actuator system may comprise one or more piezoelectric actuators. In such an example, the actuator system alternatively or additionally may comprise one or more of an electrostatic actuator and an electromagnetic actuator. In such an example, the scanning mirror system may be coupled to a circuit board. In such an example, the scanning mirror system alternatively or additionally may comprise a first sensor configured to sense strain of the flexure, the first sensor located at the first anchor. In such an example, the scanning mirror system alternatively or additionally may comprise a second sensor configured to sense strain of the flexure, the second sensor located at a non-anchor location spaced from the first anchor, the non-anchor location undergoing greater strain during actuation by the actuator system relative to the first anchor. In such an example, the scanning mirror system alternatively or additionally may comprise a logic subsystem and a storage subsystem storing instructions executable by the logic subsystem to calibrate the second sensor via output from the first sensor. In such an example, the first arm, the second arm, the third arm, and the fourth arm alternatively or additionally may be configured to mechanically amplify motion created by the actuator system. In such an example, each of the third arm and the fourth arm alternatively or additionally may define a respective gap that extends inwardly from the outer perimeter of the scanning mirror system.

Another example provides a display device comprising a light source, and a scanning mirror system coupled to a support structure and configured to scan light from the light source to form a displayed image, the scanning mirror system comprising a mirror, a flexure supporting the mirror, the flexure comprising a first portion extending in a first direction from the mirror and a second portion extending in a second direction from the mirror, a first anchor and a second anchor located on opposing sides of the mirror, a first sensor and a second sensor respectively located at the first anchor and the second anchor, the first sensor and the second sensor configured to sense strain of the flexure, a first arm extending between the first anchor and the first portion of the flexure, a second arm extending between the first anchor and the second portion of the flexure, each of the first arm and the second arm defining a respective gap that extends inwardly from an outer perimeter of the scanning mirror system, a third arm extending between the second anchor and the first portion of the flexure, a fourth arm extending between the second anchor and the second portion of the flexure, and an actuator system configured to actuate the first arm, the second arm, the third arm, and the fourth arm to thereby vary a scan angle of the mirror. In such an example, the display device alternatively or additionally may comprise one or more non-anchor sensors configured to sense strain of the flexure, the one or more non-anchor sensors located at a non-anchor location spaced from the first anchor, the non-anchor location undergoing greater strain during actuation by the actuator system relative to the first anchor.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A display device, comprising:
 a light source;
 a support structure comprising a circuit board, the circuit board comprising drive circuitry; and
 a scanning mirror system coupled to the support structure and configured to scan light from the light source to form a displayed image, the scanning mirror system comprising:
  a mirror;
  a flexure supporting the mirror, the flexure comprising a first portion extending in a first direction from the mirror and a second portion extending in a second direction from the mirror;
  a first anchor and a second anchor each coupled to the support structure, the first anchor and the second anchor located on opposing sides of the mirror;
  a first arm extending between the first anchor and the first portion of the flexure;
  a second arm extending between the first anchor and the second portion of the flexure, the first arm defining a first gap that extends inwardly from an outer perimeter of the scanning mirror system and the second arm defining a second gap that extends inwardly from the outer perimeter of the scanning mirror system;
  a third arm extending between the second anchor and the first portion of the flexure;
  a fourth arm extending between the second anchor and the second portion of the flexure; and
  an actuator system comprising a first actuator configured to actuate the first arm, a second actuator configured to actuate the second arm, a third actuator configured to actuate the third arm, and a fourth actuator configured to actuate the fourth arm, wherein the actuator system is configured to vary a scan angle of the mirror, wherein the first actuator is separated from the first arm by the first gap that extends inwardly from the outer perimeter of the scanning mirror system and wherein the second actuator is separated from the second arm by the second gap that extends inwardly from the outer perimeter of the scanning mirror system.

2. The display device of claim 1, wherein the actuator system comprises one or more piezoelectric actuators.

3. The display device of claim 1, wherein the actuator system comprises one or more of an electrostatic actuator and an electromagnetic actuator.

4. The display device of claim 1, wherein the scanning mirror system is electrically coupled to the circuit board via one or more wire bonds.

5. The display device of claim 1, further comprising a first sensor configured to sense strain of the flexure, the first sensor located at the first anchor.

6. The display device of claim 5, further comprising a second sensor configured to sense strain of the flexure, the second sensor located at a non-anchor location spaced from the first anchor, the non-anchor location undergoing greater strain during actuation by the actuator system relative to the first anchor.

7. The display device of claim 6, further comprising a logic subsystem and a storage subsystem storing instructions executable by the logic subsystem to calibrate the second sensor via output from the first sensor.

8. The display device of claim 1, wherein the first arm, the second arm, the third arm, and the fourth arm are configured to mechanically amplify motion created by the actuator system.

9. The display device of claim 1, wherein each of the third arm and the fourth arm define a respective gap that extends inwardly from the outer perimeter of the scanning mirror system.

10. A scanning mirror system, comprising:
 a support structure coupled to the scanning mirror system, the support structure comprising a circuit board, the circuit board comprising drive circuitry;
 a mirror;
 a flexure supporting the mirror, the flexure comprising a first portion extending in a first direction from the mirror and a second portion extending in a second direction from the mirror;
 a first anchor and a second anchor located on opposing sides of the mirror;
 a first arm extending between the first anchor and the first portion of the flexure;
 a second arm extending between the first anchor and the second portion of the flexure, the first arm defining a first gap that extends inwardly from an outer perimeter of the scanning mirror system and the second arm defining a second gap that extends inwardly from the outer perimeter of the scanning mirror system;
 a third arm extending between the second anchor and the first portion of the flexure;
 a fourth arm extending between the second anchor and the second portion of the flexure; and
 an actuator system comprising a first actuator configured to actuate the first arm, a second actuator configured to actuate the second arm, a third actuator configured to actuate the third arm, and a fourth actuator configured to actuate the fourth arm, wherein the actuator system is configured to thereby vary a scan angle of the mirror, wherein the first actuator is separated from the first arm by the first gap that extends inwardly from the outer perimeter of the scanning mirror system and wherein the second actuator is separated from the second arm by the second gap that extends inwardly from the outer perimeter of the scanning mirror system.

11. The scanning mirror system of claim 10, wherein the actuator system comprises one or more piezoelectric actuators.

12. The scanning mirror system of claim 10, wherein the actuator system comprises one or more of an electrostatic actuator and an electromagnetic actuator.

13. The scanning mirror system of claim 10, further comprising a first sensor configured to sense strain of the flexure, the first sensor located at the first anchor.

14. The scanning mirror system of claim 13, further comprising a second sensor configured to sense strain of the flexure, the second sensor located at a non-anchor location spaced from the first anchor, the non-anchor location undergoing greater strain during actuation by the actuator system relative to the first anchor.

15. The scanning mirror system of claim 14, further comprising a logic subsystem and a storage subsystem storing instructions executable by the logic subsystem to calibrate the second sensor via output from the first sensor.

16. The scanning mirror system of claim 10, wherein the first arm, the second arm, the third arm, and the fourth arm are configured to mechanically amplify motion created by the actuator system.

17. The scanning mirror system of claim 10, wherein each of the third arm and the fourth arm define a respective gap that extends inwardly from the outer perimeter of the scanning mirror system.

18. A display device, comprising:
a light source;
a support structure comprising a circuit board, the circuit board comprising drive circuitry; and
a scanning mirror system coupled to the support structure such that the support structure underlies the scanning mirror system, the scanning mirror system configured to scan light from the light source to form a displayed image, the scanning mirror system comprising:
a mirror;
a flexure supporting the mirror, the flexure comprising a first portion extending in a first direction from the mirror and a second portion extending in a second direction from the mirror;
a first anchor and a second anchor located on opposing sides of the mirror;
a first sensor and a second sensor respectively located at the first anchor and the second anchor, the first sensor and the second sensor configured to sense strain of the flexure;
a first arm extending between the first anchor and the first portion of the flexure;
a second arm extending between the first anchor and the second portion of the flexure, the first arm defining a first gap that extends inwardly from an outer perimeter of the scanning mirror system and the second arm defining a second gap that extends inwardly from the outer perimeter of the scanning mirror system;
a third arm extending between the second anchor and the first portion of the flexure;
a fourth arm extending between the second anchor and the second portion of the flexure; and
an actuator system comprising a first actuator configured to actuate the first arm, a second actuator configured to actuate the second arm, a third actuator configured to actuate the third arm, and a fourth actuator configured to actuate the fourth arm, wherein the actuator system is configured to vary a scan angle of the mirror, wherein the first actuator is separated from the first arm by the first gap that extends inwardly from the outer perimeter of the scanning mirror system and wherein the second actuator is separated from the second arm by the second gap that extends inwardly from the outer perimeter of the scanning mirror system.

19. The display device of claim 18, further comprising one or more non-anchor sensors configured to sense strain of the flexure, the one or more non-anchor sensors located at a non-anchor location spaced from the first anchor, the non-anchor location undergoing greater strain during actuation by the actuator system relative to the first anchor.

* * * * *